(12) United States Patent
Chun et al.

(10) Patent No.: US 8,081,662 B2
(45) Date of Patent: Dec. 20, 2011

(54) METHODS OF TRANSMITTING DATA BLOCKS IN WIRELESS COMMUNICATION SYSTEM

(75) Inventors: Sung Duck Chun, Anyang-si (KR); Young Dae Lee, Anyang-si (KR); Sung Jun Park, Anyang-si (KR); Seung June Yi, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 12/451,185

(22) PCT Filed: Apr. 30, 2008

(86) PCT No.: PCT/KR2008/002468
§ 371 (c)(1),
(2), (4) Date: Oct. 29, 2009

(87) PCT Pub. No.: WO2008/133484
PCT Pub. Date: Nov. 6, 2008

(65) Prior Publication Data
US 2010/0128742 A1    May 27, 2010

Related U.S. Application Data

(60) Provisional application No. 60/915,042, filed on Apr. 30, 2007, provisional application No. 60/915,417, filed on May 1, 2007.

(30) Foreign Application Priority Data

Apr. 30, 2008   (KR) .................. 10-2008-0040506

(51) Int. Cl.
*H04J 3/24* (2006.01)
(52) U.S. Cl. .................. 370/474; 370/437; 370/389

(58) Field of Classification Search .................. 370/229, 370/332, 335, 339, 474, 252–253, 389–427, 370/471–473, 477
See application file for complete search history.

(56) References Cited

U.S. PATENT DOCUMENTS 4,205,200 A    5/1980    Parikh et al.
(Continued)

FOREIGN PATENT DOCUMENTS
EP    1 148 753    10/2001
(Continued)

OTHER PUBLICATIONS

Panasonic, "MAC PDU format for LTE", 3GPP TSG RAN WG2 #56bis R2-070096, Jan. 2007.
(Continued)

*Primary Examiner* — Pao Sinkantarakorn
*Assistant Examiner* — Iqbal Zaidi
(74) *Attorney, Agent, or Firm* — McKenna Long & Aldridge LLP (57) ABSTRACT

Disclosed is a method for generating a data block to be transmitted from a specific layer in a transmitting side to a receiving side in a wireless communication system. The method includes receiving an upper layer datei block from an upper layer and generating a lower layer data block including at least part of the upper layer data block and state indication information indicating a state of the upper layer data block, the state indication information being selected variably according to a logical channel through which the upper layer data block is received. This method optimizes overhead of a header of each upper layer data block according to contents of the upper layer data block and event situations associated with the upper layer data block, thereby increasing system efficiency.

4 Claims, 6 Drawing Sheets

U.S. PATENT DOCUMENTS

| | | | |
|---|---|---|---|
| 6,157,833 | A | 12/2000 | Lawson-Jenkins et al. |
| 6,324,171 | B1 | 11/2001 | Lee et al. |
| 6,353,628 | B1 | 3/2002 | Wallace et al. |
| 6,526,027 | B1 | 2/2003 | Yeom |
| 6,567,409 | B1 | 5/2003 | Tozaki et al. |
| 6,725,267 | B1 | 4/2004 | Hoang |
| 7,197,317 | B2 | 3/2007 | Parkvall et al. |
| 7,245,707 | B1* | 7/2007 | Chan ................. 379/88.17 |
| 7,551,643 | B2 | 6/2009 | Yeo et al. |
| 7,680,058 | B2 | 3/2010 | Seurre et al. |
| 7,899,451 | B2 | 3/2011 | Hu et al. |
| 2001/0017850 | A1 | 8/2001 | Kalliokulju et al. |
| 2001/0044322 | A1 | 11/2001 | Raaf |
| 2002/0024972 | A1 | 2/2002 | Yi et al. |
| 2002/0028690 | A1 | 3/2002 | McKenna et al. |
| 2002/0057663 | A1 | 5/2002 | Lim |
| 2003/0007512 | A1 | 1/2003 | Tourunen et al. |
| 2003/0123485 | A1* | 7/2003 | Yi et al. ................. 370/477 |
| 2003/0165133 | A1 | 9/2003 | Garani |
| 2003/0189922 | A1 | 10/2003 | Howe |
| 2003/0207696 | A1 | 11/2003 | Willenegger et al. |
| 2004/0014452 | A1 | 1/2004 | Lim et al. |
| 2004/0028078 | A1 | 2/2004 | Beckmann et al. |
| 2004/0117860 | A1 | 6/2004 | Yi et al. |
| 2004/0121771 | A1 | 6/2004 | Song et al. |
| 2004/0253959 | A1 | 12/2004 | Hwang et al. |
| 2005/0041610 | A1 | 2/2005 | Lee et al. |
| 2005/0041681 | A1 | 2/2005 | Lee et al. |
| 2005/0085254 | A1 | 4/2005 | Chuah et al. |
| 2005/0094670 | A1 | 5/2005 | Kim |
| 2005/0141462 | A1* | 6/2005 | Aerrabotu et al. .......... 370/335 |
| 2005/0176474 | A1 | 8/2005 | Lee et al. |
| 2005/0185620 | A1 | 8/2005 | Lee et al. |
| 2005/0232271 | A1 | 10/2005 | Kettunen et al. |
| 2005/0238051 | A1 | 10/2005 | Yi et al. |
| 2006/0034335 | A1 | 2/2006 | Karaoguz et al. |
| 2006/0067324 | A1* | 3/2006 | Kim et al. ................. 370/395.2 |
| 2006/0067364 | A1* | 3/2006 | Jung et al. ................. 370/469 |
| 2006/0087994 | A1 | 4/2006 | Barth et al. |
| 2006/0098567 | A1 | 5/2006 | Willenegger et al. |
| 2006/0126554 | A1 | 6/2006 | Motegi et al. |
| 2006/0165045 | A1 | 7/2006 | Kim et al. |
| 2006/0209870 | A1 | 9/2006 | Lee et al. |
| 2006/0245417 | A1 | 11/2006 | Conner et al. |
| 2007/0047582 | A1 | 3/2007 | Malkamaki |
| 2007/0060139 | A1 | 3/2007 | Kim et al. |
| 2007/0165567 | A1 | 7/2007 | Tan et al. |
| 2007/0177569 | A1 | 8/2007 | Lundby |
| 2007/0178875 | A1 | 8/2007 | Rao et al. |
| 2007/0206531 | A1 | 9/2007 | Pajukoski et al. |
| 2007/0248075 | A1 | 10/2007 | Liu et al. |
| 2007/0258591 | A1 | 11/2007 | Terry et al. |
| 2007/0291673 | A1 | 12/2007 | Demirhan et al. |
| 2007/0291719 | A1 | 12/2007 | Demirhan et al. |
| 2007/0291728 | A1 | 12/2007 | Dalsgaard et al. |
| 2007/0291729 | A1 | 12/2007 | Dalsgaard et al. |
| 2008/0043619 | A1 | 2/2008 | Sammour et al. |
| 2008/0056198 | A1 | 3/2008 | Charpentier et al. |
| 2008/0056273 | A1 | 3/2008 | Pelletier et al. |
| 2008/0101268 | A1 | 5/2008 | Sammour et al. |
| 2008/0167089 | A1 | 7/2008 | Suzuki et al. |
| 2008/0181127 | A1 | 7/2008 | Terry et al. |
| 2008/0273610 | A1 | 11/2008 | Malladi et al. |

FOREIGN PATENT DOCUMENTS

| | | |
|---|---|---|
| EP | 1 168 877 | 1/2002 |
| EP | 1 209 938 | 5/2002 |
| EP | 1 304 898 | 4/2003 |
| EP | 1 315 356 | 5/2003 |
| EP | 1315356 A2 * | 5/2003 |
| EP | 1 318 632 | 6/2003 |
| EP | 1337124 A2 | 8/2003 |
| EP | 1 372 310 | 12/2003 |
| EP | 1 420 551 | 5/2004 |
| EP | 1 501 328 | 1/2005 |
| EP | 1 511 245 | 3/2005 |
| EP | 1 720 373 | 11/2006 |
| EP | 1720322 A1 | 11/2006 |
| EP | 1932380 | 6/2008 |
| JP | 2002-539686 | 11/2002 |
| JP | 2003-504935 | 2/2003 |
| JP | 2005-354488 | 12/2005 |
| JP | 2006-505979 | 2/2006 |
| JP | 2006-067115 | 3/2006 |
| KR | 10-2001-0105240 | 11/2001 |
| KR | 10-2004-0039944 | 5/2004 |
| KR | 10-2004-0048675 | 6/2004 |
| KR | 10-2005-0008440 | 1/2005 |
| KR | 10-2005-0027972 | 3/2005 |
| KR | 10-2005-0096763 | 10/2005 |
| RU | 2249917 C2 | 4/2005 |
| WO | WO 00/74416 | 12/2000 |
| WO | WO 2004/043094 | 5/2004 |
| WO | WO 2004/064272 | 7/2004 |
| WO | WO 2005/048613 | 5/2005 |
| WO | WO 2006/049441 A1 | 5/2006 |
| WO | WO 2006/075820 A1 | 7/2006 |
| WO | WO 2006/104344 | 10/2006 |
| WO | WO 2006/109851 | 10/2006 |
| WO | WO 2007/025138 | 3/2007 |
| WO | WO 2007/052888 | 5/2007 |
| WO | WO 2007/078155 | 7/2007 |
| WO | WO 2007/078172 | 7/2007 |
| WO | WO 2007/078929 A2 | 7/2007 |
| WO | WO 2007/133034 | 11/2007 |
| WO | WO 2008/111684 A1 | 9/2008 |
| WO | WO 2009/084998 | 7/2009 |

OTHER PUBLICATIONS

Sammour et al., U.S. Appl. No. 60/863,185.

NTT Docomo et al: "MAC PDU structure for LTE", 3GPP TSG RAN WG2 #56bis, R2-070280, Jan. 2007, XP050133369.

Catt et al: "Enhancement to Buffer Status Reporting", 3GPP TSG-RAN WG2 #57bis, R2-071345, Mar. 2007, XP050134291.

LG Electronics Inc: "PDCP retransmissions" 3GPP Draft; R2-073041 PDCP Retransmissions_V2, Aug. 16, 2007, XP050135778.

LG Electronics Inc: "Contents of PDCP Status Report R2-07xxxx", 3GPP TSG-RAN WG2, 59, Oct. 8, 2007, pp. 1-3, XP002580785.

"PDCP Structure and Traffic Path" 3GPP Draft; R2-073259, Aug. 16, 2007, XP050135985.

Asustek: "Granularity Consideration for Variable RLC PDUsizes"; R2-070336, XP050133423.

"3GPP; Technical Specification Group Raido Access Network; Medium Access control (MAC) protocol specification (Release 7)"; XP050367709.

Bosch: "Header Compression Signalling" 3GPP Draft; XP050114120.

3GPP Generation Partnership Project; 3Gpp Standard; 3Gpp TS 25.323, XP050367856.

Nokia; "Requirements for redirection in E-UTRAN", 3GPP TSG-RAN WG2 Meeting #56-bis, R2-070107, Jan. 2007.

LG Electronics; "Relative Buffer Status Reporting", 3GPP TSG-RAN WG2 meeting #46bis, R2-050852, Apr. 2005.

IPWireless; "Layer 2 functions for LTE", 3GPP TSG RAN WG2 #48bis, R2-052377, Oct. 2005.

Samsung; "Selective forwarding/retransmission during HO", 3GPP TSG-RAN2 Meeting #56bish, R2-070130, Jan. 2007.

Samsung; "Re-use of PDCP SN at ARQ level?", 3GPP TSG-RAN2 Meeting #53bis, R2-061829, Jun. 2006.

Youjun Gao et al: "Research on the access network and MAC technique for beyond 3G systems" IEEE Wireless Communications, IEEE Service Center, Piscataway, NJ, US, vol. 14, No. 2, Apr. 1, 2007, pp. 57-61, XPO11184637 ISSN: 1536-1284.

XP002460800; Alcatel-Lucent: "Downlink Control Signaling and Multiplexing for VOIP, R1-071721" Jun. 26, 2007, pp. 1-4.

XP002602993; Nokia Corporation, Nokia Siemens Networks: "MAC header format, R2-073891", 3GPP TSG RAN WG2 meeting 59bis, Oct. 1, 2007.

XP050134474; LG Electronics Inc: "Support for VoIP over MAC-hsEHS" 3GPP Draft; R2-071542, Apr. 2, 2007.

LG Electronics: "UL Timing Control related to Contention Resolution", 3GPP TSG-RAN WG2 #61 bis, Shenzhen, China, Mar. 31-Apr. 4, 2008, R2-081607, XP050139334.

3rd Generation Partnership Project: Evolved Universal Terrestrial Radio Access (E-UTRA) Medium Access Control (MAC) protocol specification (Release 8), Technical Specification Group Radio Access Network, Mar. 1, 2008, XP050377617.

Nokia: "Active Mode DRX", 3GPP TSG-RAN WG2 Meeting #55, Seoul, Korea, Oct. 9-11, 2006, R2-062752.

NTT DoCoMo, Inc.: "Views on DRX/DTX control in LTE", 3GPP TSG RAN WG2 #56, Riga, Lativa, Nov. 6-10, 2006, R2-063397.

Email Rapporteur (Nokia): "DRX in E-UTRAN", 3GPP TSG-RAN WG2 Meeting #57, St. Louis, Missouri, Feb. 12-16, 2007, R2-070463.

Ericsson: "MAC header for improved L2 support for high data rates", 3GPP TSG-RAN WG2 #57, St. Louis, Missouri, Feb. 12-16, 2007, R2-070810.

* cited by examiner

METHODS OF TRANSMITTING DATA BLOCKS IN WIRELESS COMMUNICATION SYSTEM

This application claims priority to International Application No. PCT/KR2008/002468 filed on Apr. 30, 2008, which claims priority to U.S. Provisional Application No. 60/915,042 filed on Apr. 30, 2007, U.S. Provisional Application No. 60/915,417, filed May 1, 2007 and Korean Patent Application No. 10-2008-0040506, filed on Apr. 30, 2008, all of which are incorporated by reference for all purposes as if fully set forth herein.

TECHNICAL FIELD

The present invention relates to a wireless communication system, and more particularly, to a method for transmitting data blocks in a wireless communication system.

BACKGROUND ART

Figure 1:
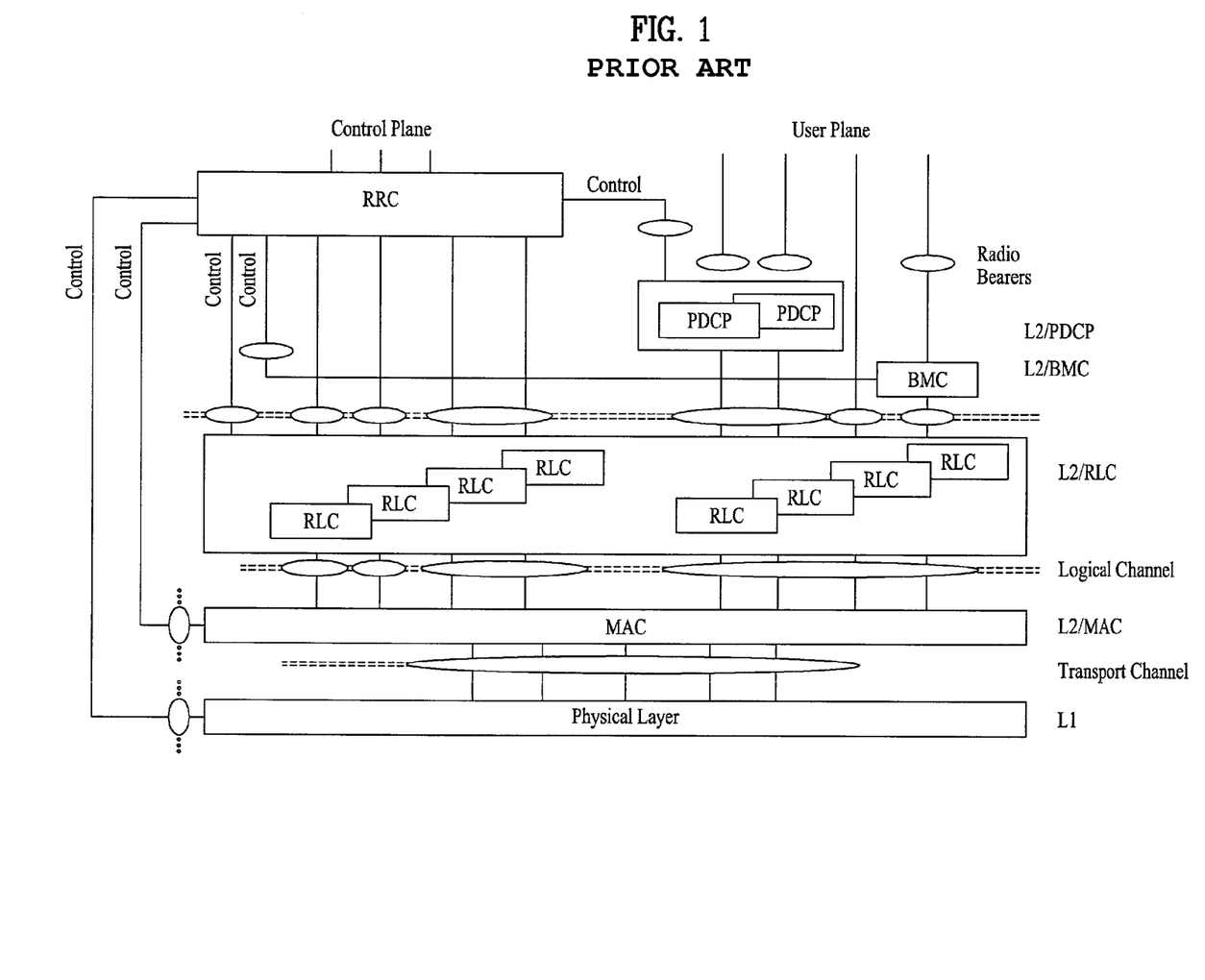
FIG. 1 illustrates the structure of a wireless access protocol responsible for data transmission in a radio link of a Universal Mobile Telecommunication System (UMTS) which is a third generation mobile communication system.

FIG. 1 illustrates the structure of a wireless access protocol responsible for data transmission in a radio link of a Universal Mobile Telecommunication System (UMTS) which is a third generation mobile communication system. Data link layers corresponding to the second layer (Layer 2: L2) of the Open System Interconnection (OSI) reference model include a Medium Access Control (MAC) layer, a Radio Link Control (RLC) layer, a Packet Data Convergence Protocol (PDCP) layer, and a Broadcast/Multicast Control (BMC) layer. The physical layer corresponds to the first layer (Layer 1: L1). Information exchange between protocol layers is performed through virtual access points that are referred to as "Service Access Points (SAPS)", which are represented by ovals in FIG. 1. Data units communicated between layers are given different names. These data units are referred to as "Service Data Units (SDUs)" and basic units that protocols use for transmitting data are referred to as "Protocol Data Units (PDUs)". In the following description of the invention, data delivered between layers in the wireless access protocol structure indicates data blocks in specific units such as SDUs or PDUs described above.

The MAC layer is a layer responsible for mapping between logical and transport channels. The MAC layer selects an appropriate transport channel for transmitting data received from the RLC layer and adds required control information to a header of a MAC PDU. Special functions performed by the MAC layer include a radio resource management function and a measurement function. The radio resource management function is not performed solely by the MAC layer. Instead, the radio resource management function serves to set operations of the MAC layer based on various MAC parameters received from a Radio Resource Control (RRC), which is located above the MAC layer, to control data transmission. Examples of the radio resource management function include a function to change mapping relations between logical and transport channels or to multiplex and transmit data through a scheduling function. The measurement function is to measure the amount of traffic of a terminal and to report the measurement to an upper layer. The upper layer can change the configuration (or setting) of the MAC layer based on the measurement information obtained by the MAC layer of the terminal, thereby efficiently managing radio (wireless) resources.

The RLC layer is located above the MAC layer and supports reliable data transmission. The RLC layer segments and concatenates RLC Service Data Units (SDUs) received from the above layer in order to construct data having a size suitable for a radio link. An RLC layer at the receiving side supports data recombination in order to restore original RLC SDUs from the received RLC PDUs. Each RLC entity can operate in a Transparent Mode (TM), an Unacknowledged Mode (UM), or an Acknowledged Mode (AM) according to processing and transmission methods of RLC SDUs. When the RLC entity operates in the TM, it transfers an RLC SDU received from an upper entity or layer to the MAC layer without adding any header information to the RLC SDU. When the RLC entity operates in the UM, it segments/concatenates RLC SDUs to construct RLC PDUs and adds header information including a sequence number to each RLC PDU. However, in the UM, the RLC entity does not support data retransmission. When the RLC entity operates in the AM, it can use the RLC SDU segmentation/concatenation function to construct RLC PDUs and can perform retransmission when packet transmission has failed. Various parameters and variables such as a transmission window, a reception window, a timer, and a counter are used for the retransmission function in the AM.

The PDCP layer is used only in packet exchange regions and can compress and transmit IP packet headers so as to increase the transmission efficiency of packet data in wireless channels. The PDCP layer also manages sequence numbers in order to prevent data loss during Serving RNC (SRNC) relocation.

The BMC layer broadcasts cell broadcast messages received from a core network to multiple users through a common channel.

The physical layer, which is the first layer, provides an information transfer service to an upper layer using a physical channel. The physical layer is connected to the Media Access Control (MAC) layer located above the physical layer through a transport channel. Data is transferred between the MAC layer and the physical layer through the transport channel. Data is transferred between different physical layers (specifically, physical layers of transmitting and receiving sides) through a physical channel.

A Radio Resource Control (RRC) layer, which is the third layer located at the bottom, is defined only in the control plane and is responsible for controlling logical, transport, and physical channels in association with configuration, re-configuration, and release of Radio Bearers (RBs). RBs are services that the second layer provides for data communication between terminals and a network including a base station. The control plane is a hierarchy in which control information is transferred in the vertical structure of the wireless access protocol of FIG. 1 and the user plane is a hierarchy in which user information such as data/information is transferred.

As shown in FIG. 1, an RLC PDU generated in the RLC layer is transferred to the MAC layer and is handled as a MAC SDU in the MAC layer. While a MAC SDU, which is an RLC PDU received from the RLC layer, undergoes various functions of the MAC layer, various header information required for data processing is added to the MAC SDU. The header information can be altered depending on mapping relations between logical and transport channels.

Logical channels provide transport passages required for data exchange between the MAC and the RLC layer. Each logical channel is classified into control and traffic channels according to the type of data transmitted therethrough. The control channel transmits data of the control plane and the traffic channel transmits user traffic data. A logical channel is a type of data stream carrying a specific type of information. Each logical channel is generally connected to one RLC entity. One or more logical channels of the same type can also be connected to an RLC entity. Transport channels provide passages for data communication between the physical and MAC layers. A data stream in a logical channel is embodied as a MAC PDU in the MAC layer. Reference will now be made to the MAC PDU.

Figure 2:
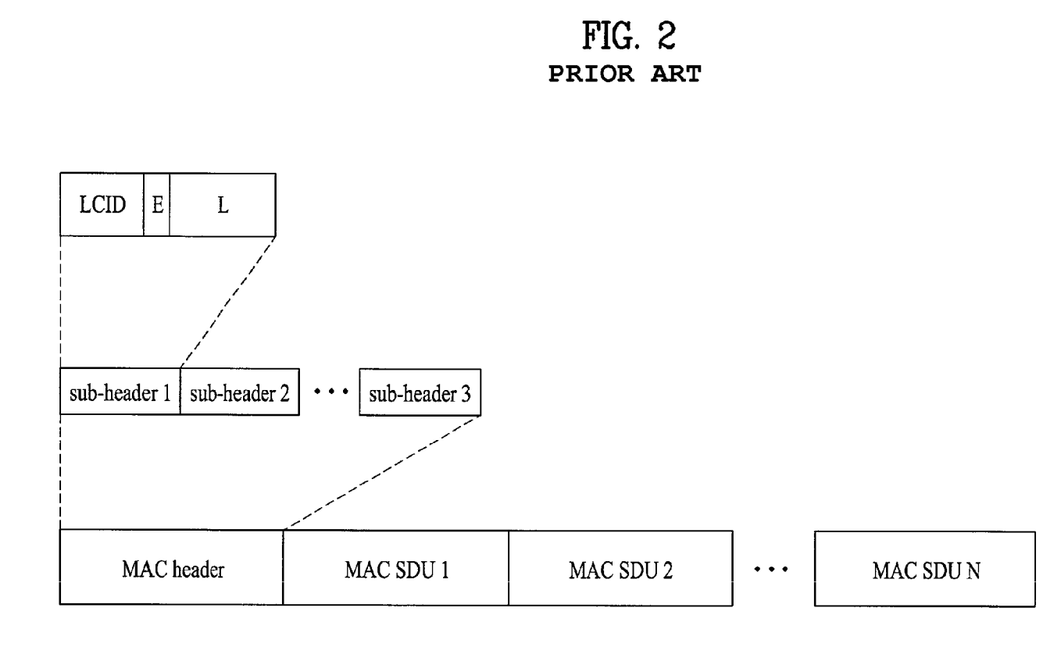
FIG. 2 illustrates an example structure of a MAC PDU with a header added thereto in a mobile communication system.

FIG. 2 illustrates an example structure of a MAC PDU with a header added thereto in a mobile communication system. A MAC PDU includes one or more MAC SDUs corresponding to payload for data and a MAC header which is a set of MAC sub-headers indicating the size or type of each MAC SDU. In the example of FIG. 2, it is assumed that a total of N upper layer data blocks are provided. A MAC sub-header includes a Logical Channel ID (LCID) identifying each SDU, a length field (L) indicating the size of each SDU, and an extension field (E) indicating whether a subsequent field is a MAC header or an SDU to indicate whether or not additional headers are present.

The LCID indicates which logical channel corresponds to data of a MAC SDU which is an upper layer data block associated with a sub-header including the LCID. That is, one MAC PDU includes one or more upper layer data blocks and different logical channels can be allocated to the upper layer data blocks individually.

Generally, one or more logical channels can be established between a terminal and a base station. For example, in the case of a voice service, not only a logical channel carrying voice traffic but also a logical channel for a Signaling Radio Bearer (SRB) for control information communicated between the base station and the terminal can be established between the base station and the terminal. In this case, state changes of the SRB and state changes of the voice traffic channel may occur independently of each other. More specifically, change of an Adaptive Multi-Rate (AMR) codec mode in the voice traffic channel and generation of an urgent message in the SRB channel may occur independently of each other. Therefore, an upper layer data block for voice traffic and an upper layer data block for an SRB can both be allocated to one MAC PDU and the size or the like of each upper layer data block can be set to be different according to the type and usage of a logical channel associated with the upper layer data block. The size of each upper layer data block can be set through a size field in a MAC sub-field of a MAC SDU corresponding to the upper layer data block.

DISCLOSURE

Technical Problem

Since MAC header values, which are part of a MAC PDU (i.e., a lower layer data block) excluding MAC SDUs (i.e., upper layer data blocks) containing payload, are not actual data values as described above, it is necessary to minimize the MAC header values to increase throughput. However, the sizes or types of the fields of the MAC header are fixed and used regardless of which logical channel is associated with each MAC SDU in the MAC PDU, regardless of what are actual contents of the MAC SDU, etc. This causes a reduction in system efficiency due to overhead of control signals.

It is also necessary to allocate radio resources to the upper layer data block suitable for characteristics of the upper layer data block and to perform an operation on the upper layer data block according to urgency and importance of the processing of upper layer data block.

The present invention has been suggested to overcome the above problems in the background art, and it is an object of the present invention to provide a method for generating a data block in a communication system.

Another object of the present invention is to provide a method for generating a data block using state indication information of one or more upper layer data blocks in a communication system.

Technical Solution

In an aspect of the invention, there is provided a method for generating a data block to be transmitted from a specific layer in a transmitting side to a receiving side in a wireless communication system. This method includes receiving an upper layer data block from an upper layer, and generating a lower layer data block including at least part of the upper layer data block and state indication information indicating a state of the upper layer data block, the state indication information being selected variably according to a logical channel through which the upper layer data block is received.

In another aspect of the invention, there is provided a data block structure transmitted from a specific layer in a transmitting side to a receiving side in a wireless communication system. The data block structure includes a first field including an identifier of a logical channel through which an upper layer data block is received, a second field including state indication information indicating a state of the upper layer data block received from an upper layer, the state indication information being selected variably according to the logical channel through which the upper layer data block is received, and at least part of the upper layer data block.

Advantageous Effects

The method for generating a data block in a wireless communication system according to the invention provides the following advantages.

First, the overhead of a header of each upper layer data block is optimized according to contents of the upper layer data block and event situations associated with the upper layer data block, thereby increasing system efficiency.

Second, the receiving side of the upper layer data block can efficiently manage radio resources using the state indication information.

MODE FOR INVENTION

The above and other configurations, operations, and features of the present invention will be more easily understood from the embodiments of the invention described with reference to the accompanying drawings. The detailed description, which will be given below with reference to the accompanying drawings, is intended to explain exemplary embodiments of the present invention, rather than to show the only embodiments that can be implemented according to the invention. The embodiments described below are examples wherein the technical features of the invention are applied to an Evolved Universal Mobile Telecommunications System (E-UMTS) that is also called a "Long Term Evolution (LTE) system". It is apparent that the technical features of the invention can also be applied to other similar mobile communication systems such as IEEE 802.16m or Wibro systems.

The E-UMTS system is an evolved version of the conventional WCDMA UMTS system and a basic standardization process thereof is in progress in the 3rd Generation Partnership Project (3GPP). For details of the technical specification of UMTS and E-UMTS, see Release 7, Release 8, and Release 9 of "3rd Generation Partnership Project; Technical Specification Group Radio Access Network".

The technology described below can be used for various communication systems including a system using multiple antennas.

Communication systems are widely disposed to provide various communication services such as voice and packet data services. This technology can be used for downlink or uplink. The term "downlink" refers to communication from a base station to a terminal and "uplink" refers to communication from a terminal to a base station. The term "base station" generally refers to a fixed point that communicates with terminals and includes a network excluding terminals in a communication system including not only a physical transport end but also upper layers. Thus, in the invention, the network and base station are considered identical as they constitute the side opposite the terminals. Terminals may be fixed or mobile. The invention can be used in a single-carrier or multi-carrier communication system. The multi-carrier system can use Orthogonal Frequency Division Multiplexing (OFDM) or other multi-carrier modulation techniques.

Figure 3:
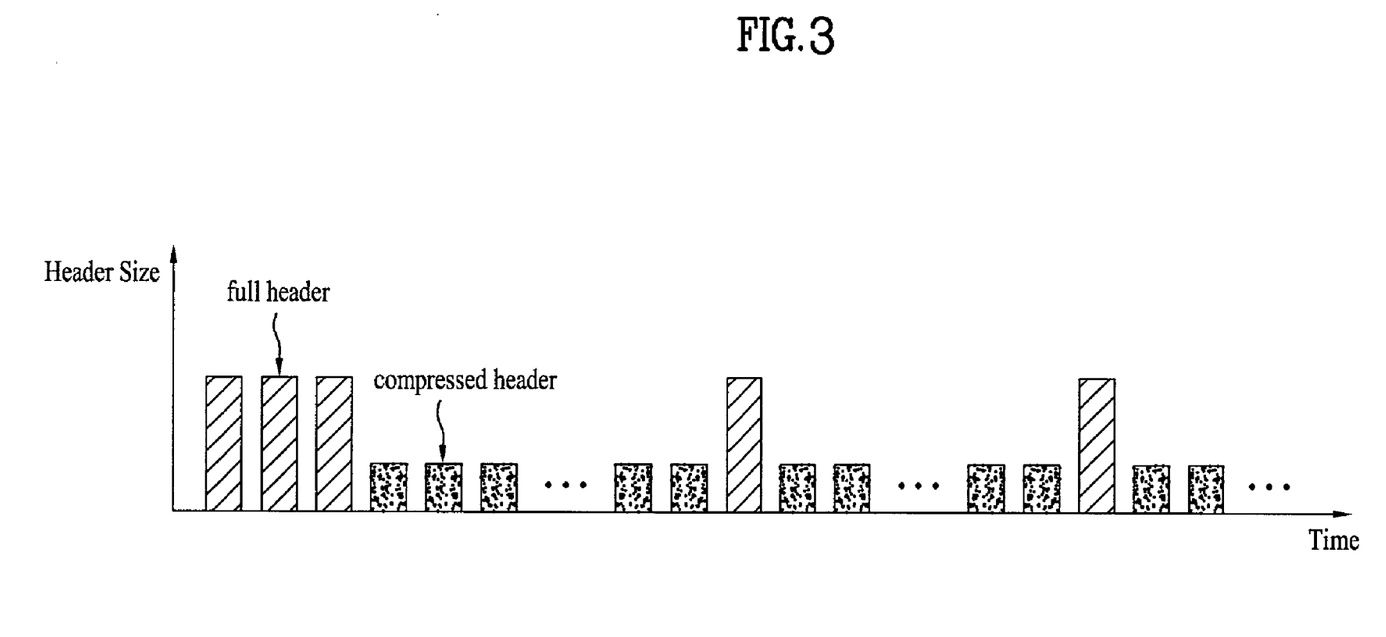
FIG. 3 illustrates a structure of a network in an E-UMTS system in the related art.

FIG. 3 illustrates a structure of a network in the E-UMTS system.

The E-UMTS network can be mainly divided into an E-UTRAN and a CN. The E-UTRAN includes terminals (or User Equipments (UEs)), base stations (or eNode Bs (eNBs)), a Serving Gateway (S-GW) located at an end of the network and connected to an external network, and a Mobility Management Entity (MME) that manages mobility of UEs. One eNB may have one or more cells. eNBs are connected to each other through an X2 interface. Each eNB is connected to UEs through a radio interface and is connected to an Evolved Packet Core (EPC) through an S1 interface.

An embodiment of the invention suggests a method for generating data blocks to be transferred to a lower layer using state indication information indicating occurrence of a specific event associated with at least one upper layer data block to be transferred to a MAC layer and the type of a logical channel associated with the at least one upper layer data block.

The specific event suggested in the embodiment of the invention indicates occurrence, change, or removal of a specific situation associated with at least one of the type and contents of a logical channel carrying the upper layer data block.

The specific event may be set for each logical channel. The logical channel may be any type of logical channel such as a channel indicating system control information, a channel carrying paging (or call) information of a terminal, a channel for dedicated control information between a terminal and a base station, a channel for common control information, a channel for dedicated traffic for a specific terminal, and a channel for common traffic.

State indication information suggested in an embodiment of the invention indicates the occurrence or nonoccurrence of the specific event associated with a logical channel identified by an identifier of an upper layer data block included in a MAC header. More specifically, the MAC layer can receive an LCID that serves as an identifier of an upper layer data block for the same type of service from an upper layer and can determine which logical channel corresponds to the upper layer data block and can receive, from the upper layer, information indicating whether or not a specific situation associated with the logical channel has occurred or can determine the size or the like of radio resources required by the MAC layer to determine the value of the state indication information.

The state indication information may be one or more bits long. The number of bits of the state indication information is determined according to the number of specific events associated with the logical channel identified by the LCID. More specifically, 1 bit suffices for the state indication information if the number of specific events associated with the logical channel is 2 and 2 bits suffice if the number of specific events is 4. The number of bits of the state indication information can be changed according to the system operating mode.

A specific event for setting the state indication information suggested in an embodiment of the invention is an occasion where the upper layer data block is a voice data block. This informs the MAC layer or the receiving side of facts such as the fact that real-time processing is required and a relatively low amount of radio resources suffices compared to when the upper layer data block associated with the specific logical channel is a non-voice data block. This enables appropriate radio resource allocation.

A specific event for setting the state indication information suggested in another embodiment of the invention is an occasion where the upper layer data block is a silent data block. This increases the efficiency of resource management in a system that allocates radio resources in units of milliseconds or tens of milliseconds (possibly, in other units smaller than milliseconds or greater than tens of milliseconds) since the minimum amount of radio resources for maintaining call connection is required in the case where the upper layer data block is a silent data block.

A specific event for setting the state indication information suggested in another embodiment of the invention is an occasion where the upper layer data block is an RRC control message data block. Examples of the RRC control message include system information and RRC connection request, establishment, and release-related messages. The MAC layer or receiving side determines the priority of processing of the upper layer data block and the amount of radio resources required for the upper layer data block according to the type of the RRC control message.

A specific event for setting the state indication information suggested in another embodiment of the invention is an occasion where the upper layer data block is a Non Access Stratum (NAS) control message data block. The MAC layer or receiving side determines the priority of processing of the upper layer data block and the amount of radio resources required for the upper layer data block according to the system operating mode since the NAS control message includes protocols associated with signaling between UEs and a core network.

A specific event for setting the state indication information suggested in another embodiment of the invention is an occasion where the upper layer data block is associated with a full header data block or a compressed header data block. As described above, the PDCP layer located above the MAC layer compresses header information of an IP-based data stream such as Transmission Control Protocol (TCP)/Internet Protocol (IP) or Routing Table Protocol (RTP)/User Datagram Protocol (UDP)/IP to increase data transmission efficiency. More specifically, header compression is performed to increase transmission efficiency of IP packet data which is a data block in a wireless channel since the size of a header of an IP packet used in a wired network covers a significant proportion of the overall size of the IP packet. Header compression is based on the fact that each of the headers of packets belonging to the same packet stream has a large constant portion. Header compression is a method for reducing the overhead of headers by storing constant fields in context format in both a compressor of the transmitting side and a decompressor of the receiving side and then transmitting only changed fields after the context is created.

A PDCP entity of the transmitting side receives a PDCP SDU from an upper layer and compresses header information of the corresponding packet using a unique header compression scheme to construct a PDCP PDU and then transfers the PDCP PDU to the RLC layer.

Figure 4:
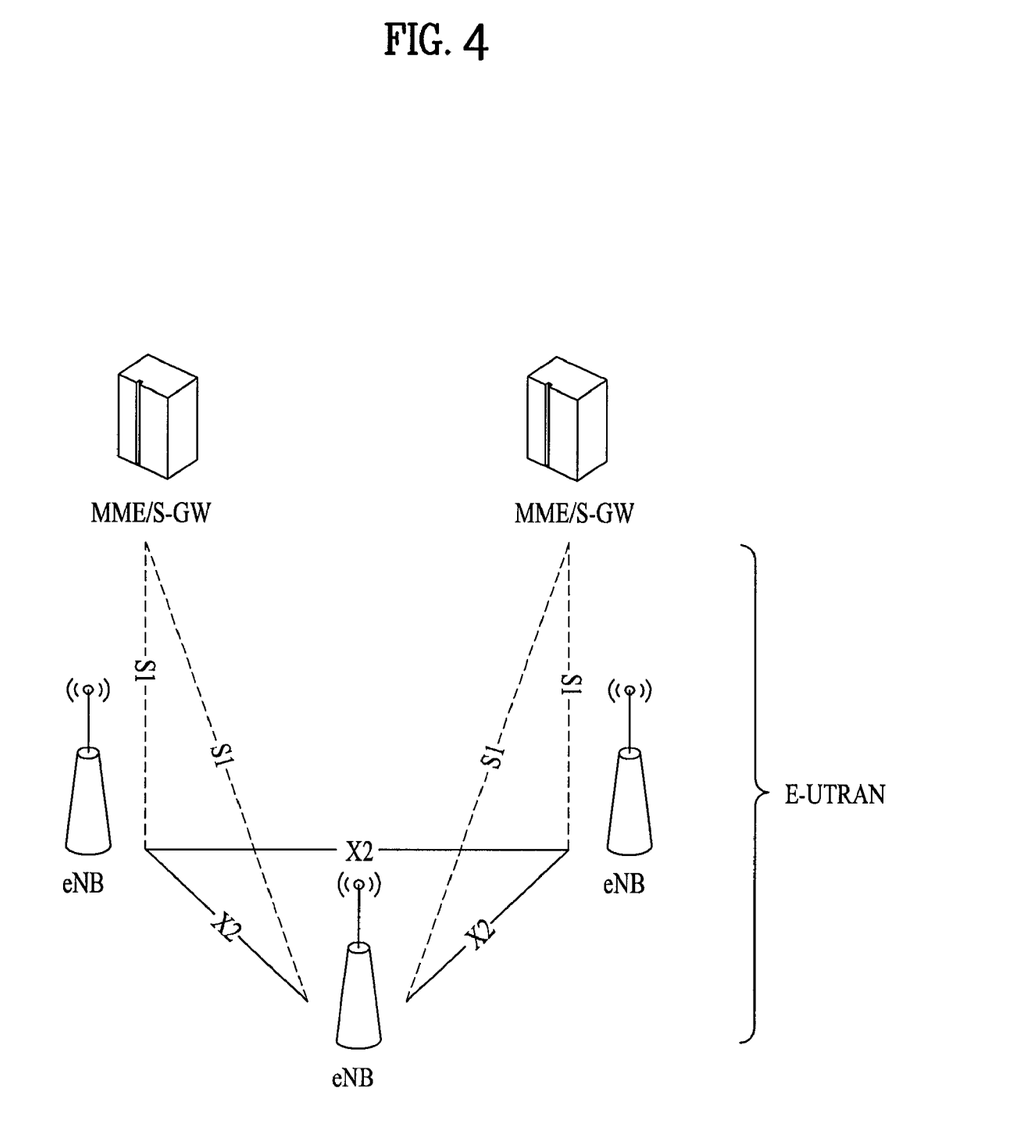
FIG. 4 illustrates example transmission of a full header packet and a compressed header packet when a conventional header compression scheme is employed.

FIG. 4 illustrates example transmission of a full header packet and a compressed header packet when a conventional header compression scheme is employed. In the following description, packets associated with header compression indicate IP-based data packets such as TCP/IP packets.

At an initial stage of header compression of a packet stream, header compression provides no benefit since the compressor transmits a full header packet to form context of the packet stream. However, after context is created, header compression provides significant benefits since the compressor transmits only compressed header packets. Which packet is to be transmitted with a full header and which packet is to be transmitted with a compressed header is determined solely by the compressor. Generally, a full header packet is transmitted when context of a packet stream is initially created and, thereafter, a full header packet is transmitted each time a predetermined time elapses while compressed header packets are transmitted so that context of the decompressor is synchronized with context of the compressor.

Upon receiving a packet from an upper layer, a PDCP compressor in a transmitting side transmits the packet together with a full or compressed header to a receiving side according to the pattern of the header of the packet. The compressor transmits the packet as a full header packet if it determines that it is necessary to create new context or update context and transmits the packet as a compressed header packet if it determines that context of the header pattern of the packet has already been created in the decompressor.

The PDCP decompressor in the receiving side needs to receive a full header packet of a packet stream to create corresponding context because the context is a basis for recovering compressed headers that will be received afterwards. If the decompressor receives a compressed header packet before context has been created, the compressor discards the received packet since it cannot reconstruct the original header of the packet.

More specifically, when a header compression scheme is used for a PS service in a radio link, the transmitting-side PDCP transmits each packet, received in a stream having the same Quality of Service (QoS) from an upper layer, as one of a packet that serves to create or update context or a packet that does not serve to create or update context. The packet that serves to create or update context can be considered much more important than the packet that does not serve to create or update context since all packets that are not to create or update context, subsequent to a packet that serves to create or update context, will be discarded without being decompressed at the receiving side if the packet that serves to create or update context has not been successfully received by the receiving side.

Therefore, the MAC layer or the receiving side is previously informed whether or not a header of an upper layer data block associated with a common or dedicated traffic channel has been compressed, thereby allowing the MAC layer or the receiving side to determine the priority of processing of the upper layer data block, the importance of the processing, the amount of radio resources that should be secured, and the like.

Table 1 illustrates an example where an LCID serving as an identifier of an upper layer data block indicates a logical channel associated with a dedicated or common traffic channel and a 2-bit state indication information indicates whether or not compression of a header has occurred as an event associated with the logical channel according to another embodiment of the invention.

TABLE 1

| STATE INDICATION INFORMATION (2 BITS) | HEADER OF CURRENT OR NEXT UPPER LAYER DATA BLOCK |
|---|---|
| 0b00 | currently transmitted upper layer data block has full header |
| 0b01 | currently transmitted upper layer data block has compressed header |
| 0b10 | next upper layer data block for transmission has full header |
| 0b11 | next upper layer data block for transmission has compressed header |

A specific event for setting the state indication information suggested in another embodiment of the invention is an occasion where an AMR codec mode has been changed in an upper entity associated with the state indication information.

The AMR codec used in voice communication has one or more modes which are classified according to the size of voice information data. For example, a 136-bit upper layer data block (MAC SDU) is transferred to the MAC layer every 20 ms in a narrow-band AMR 4.75 kbps mode and a 288-bit upper layer data block (MAC SDU) is transferred to the MAC layer every 20 ms in a narrow-band AMR 12.65 kbps mode. That is, when the voice AMR code operates in one mode, the AMR codec entity generates voice information of a specific size at specific time intervals. Therefore, the size of a voice information packet transferred from the upper layer to the MAC layer is constant unless the AMR codec mode is changed. Generally, a base station or a terminal selects an AMR codec mode for use taking into consideration the amount of radio resources available in a corresponding cell, the amount of transmitted data agreed between the terminal and the base station, or the state of load in the cell. The selected AMR codec mode can be reset according to the state of the cell. Accordingly, both the base station and the terminal need to be able to cope with changes of the AMR code mode.

Voice information generated through the AMR codec (i.e., voice codec) used for voice communication has special characteristics. Voice data has two patterns, one being a talk spurt period during which somebody speaks and the other being a silent period during which nobody speaks. A voice data block containing voice information is generated every 20 ms in the talk spurt period and a silent data block containing voice information is generated every 160 ms in the silent period.

When the generated voice information corresponds to the talk spurt period, the base station will set radio resources according to the characteristics of the talk spurt period in order to efficiently use radio resources. More specifically, the base station will set radio resource information allocated to the terminal at intervals of 20 ms in consideration of the fact that a voice data block is generated every 20 ms.

In this case, if the state of the terminal is changed from the talk spurt period to the silent period, a large portion of the radio resources allocated at intervals of 20 ms will not be used since the silent data block is generated every 160 ms. Accordingly, the base station needs to immediately detect that the state of the terminal has been changed to the silent period and to immediately reset radio resources, thereby preventing waste of radio resources.

Similarly, one can consider that the base station sets scheduling resources to allow the terminal to use radio resources at intervals of 160 ms according to the silent period. In this case, if the state of the terminal is changed from the silent period to the talk spurt period, voice information transmission is delayed since the amount of resources allocated to the terminal is small although the amount of voice information to be transmitted from the terminal is large. In this case, the base station also needs to immediately reset radio resource allocation information.

Therefore, state indication information suggested in another embodiment of the invention indicates whether or not a change has been made in the voice AMR codec mode or whether or not a change has been made between the talk spurt period and the silent period.

Table 2 illustrates an example of 2-bit state indication information for an event indicating whether or not a change has been made in the AMR codec mode or whether or not a change has been made between the talk spurt period and the silent period during AMR-based voice communication using a dedicated or common traffic channel according to another embodiment of the invention.

TABLE 2

| STATE INDICATION INFORMATION (2 BITS) | HEADER OF CURRENT OR NEXT UPPER LAYER DATA BLOCK |
|---|---|
| 0b00 | no change |
| 0b01 | AMR codec mode is changed |
| 0b10 | Change is made from silent period to talk spurt period |
| 0b11 | Change is made from talk spurt period to silent period |

In Table 2, an example change of the AMR codec mode is a change between a narrow-band AMR 4.75 kbps mode and a narrow-band AMR 12.65 kbps mode.

A specific event for setting the state indication information suggested in another embodiment of the invention is an occasion where an upper layer data block associated with the state indication information is an urgent control message or a non-urgent control message.

Control information communicated through a Signaling Radio Bearer (SRB) for control of configuration (or setup) between a base station and a terminal can be classified into relatively urgent control information and relatively non-urgent control information. An example of the urgent control information is control information associated with a handover command received from the base station when a terminal moves between cells, and an example of the relatively non-urgent control message is control information that the base station uses to notify one or more terminals of broadcast service channel information.

In this case, when a logical channel indicated by an identifier of an upper layer data block is a channel carrying system information such as a Broadcast Control CHannel (BCCH), 1-bit state indication information can be used to indicate whether the upper layer data block that is being currently processed or will be processed next is an urgent message.

Information regarding a specific event for setting the state indication information suggested in another embodiment of the invention can be provided to each terminal through system information or traffic information communicated between the base station and the terminal. More specifically, during RB configuration or re-configuration, the base station notifies, through an RRC configuration message, the terminal of specific events that the terminal needs to check for a specific logical channel and of relations between the events and respective state indication information values, thereby allowing the terminal to perform transmission according to the notification.

Although the upper layer data block is a MAC SDU and a data block transferred to a lower layer is a MAC PDU in the above embodiments of the invention, the invention is not necessarily applied to SDUs and PDUs of the MAC layer and may be applied to SDUs and PDUs of any other layer in which the above functions can be implemented or are needed.

Figure 5:
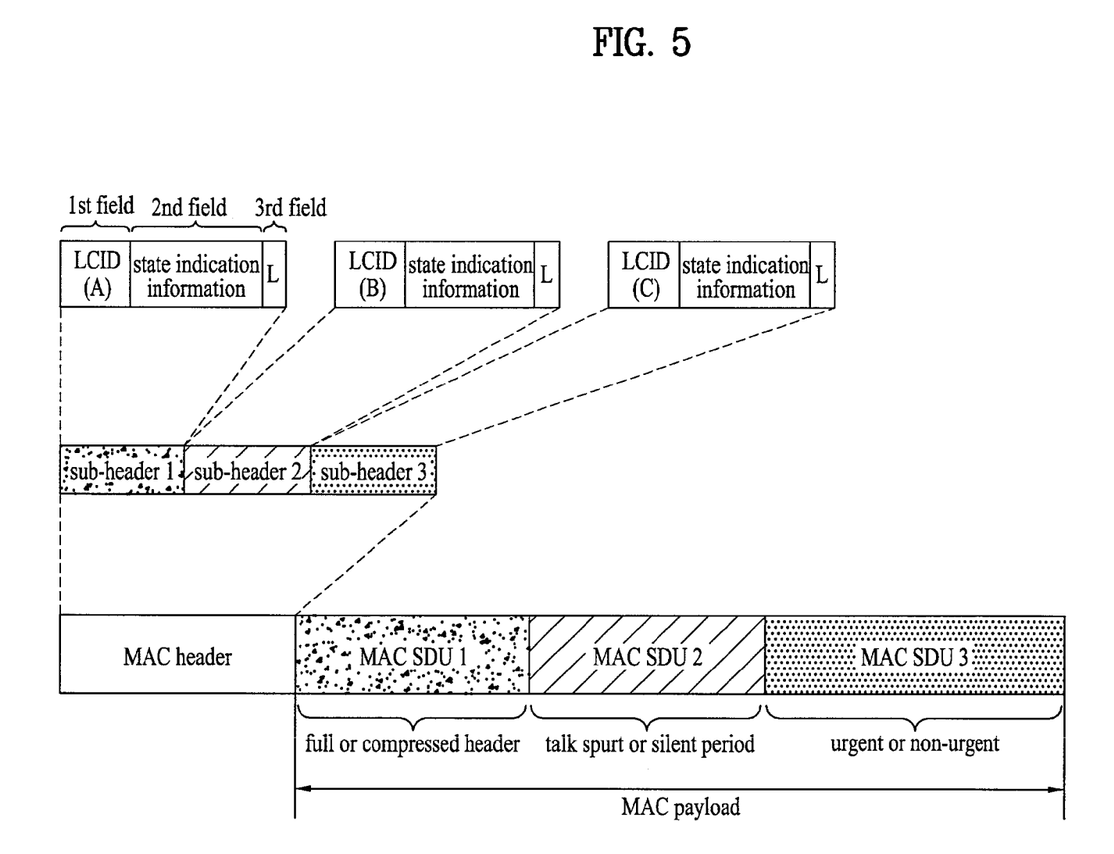
FIG. 5 illustrates a MAC PDU including at least one state indication information suggested in another embodiment of the invention.

FIG. 5 illustrates a structure of a MAC PDU including at least one state indication information suggested in another embodiment of the invention.

A sub-header of each upper layer data block includes a first field including an LCID as an identifier of a logical channel through which the upper layer data block is received, a second field including state indication information indicating the state of the upper layer data block, the state indication information being selected variably according to the logical channel through which the upper layer data block is received, and a third field including information indicating the size of the upper layer data block. The order of arrangement of the first to third fields shown in FIG. 5 can be changed according to system situations.

FIG. 5 illustrates example usage of state indication information having one bit indicating an event associated with each upper layer data block in a MAC PDU having three upper layer data blocks carrying 3 different logical channels.

The first upper layer data block is a TCP/IP packet and uses state indication information indicating whether or not header compression has been applied.

A logical channel capable of carrying a TCP/IP packet such as a Dedicated Traffic CHannel (DTCH) or a Common Traffic Channel (CTCH) can be indicated by an LCID of "A". Here, "A" represents a specific binary value.

That is, when the LCID is "A", the upper layer data block is a TCP/IP packet and an event associated with the upper layer data block includes an event regarding whether a header of the TCP/IP packet is a full header or a compressed header.

The state indication information in the first sub-head indicates a "full header" when the value of the state indication information is "1" and indicates a "compressed header" when the value of the state indication information is "0". Alternatively, the state indication information in the first sub-head can be set to indicate a "full header" when the value of the state indication information is "0" and to indicate a "compressed header" when the value of the state indication information is "1".

When a receiving side receives an upper layer data block whose LCID is "A", the receiving side checks state indication information to determine whether the received upper layer data block is a full header or a compressed header and allocates radio resources according to the determination to the upper layer data block or requests that the transmitting side allocate radio resources according to the determination to the upper layer data block.

The second upper layer data block is a VoIP packet and uses state indication information for discriminating between a talk spurt period and a silent period.

The upper layer data block to which VoIP is applied uses an LCID of "B" which can indicate a logical channel capable of carrying a VoIP packet. Here, "B" represents a specific binary value.

More specifically, when the LCID in the second sub-head is "B", the state indication information in the second sub-head indicates a "talk spurt period" if the value of the state indication information is "1" and indicates a "silent period" if the value of the state indication information is "0". Alternatively, the state indication information in the second sub-head can be set to indicate a "talk spurt period" when the value of the state indication information is "0" and to indicate a "silent period" when the value of the state indication information is "1".

When a receiving side receives an upper layer data block with an LCID of "B" and a state indication information value of "1", the receiving side determines that the upper layer data block corresponds to a talk spurt period and allocates radio resources according to the talk spurt period to the upper layer data block or requests that the transmitting side allocate radio resources according to the talk spurt period.

When the state indication information value is "0", the receiving side determines that the upper layer data block corresponds to a silent period and allocates radio resources according to the silent period or requests that the transmitting side allocate radio resources according to the silent period.

In the case of VoIP services, a talk spurt period and a silent period are defined as described above. Thus, if the current state indication information is different from state indication information of a previous transmission period, the receiving side may previously perform or request allocation of radio resources corresponding to the specific talk spurt period or the specific silent period.

The third upper layer data block relates to specific control information. Control information transmitted through a Signaling Radio Bearer (SRB) for control of configuration (or setup) between a base station and a terminal or the like can be classified into relatively urgent control information such as a handover command and relatively non-urgent control information such as broadcast service channel information as described above.

Thus, in the case of an upper layer data block using a logical channel such as a BCCH, a PCCH, a DCCH, or a CCCH, it is possible to determine, through state indication information, whether or not generation of urgent control information or non-urgent control information has occurred as an event associated with the upper layer data block. In this embodiment, the state indication information indicates an urgent message if the value of the state indication information is "1" and indicates a non-urgent message if the value of the state indication information is "0". Alternatively, the state indication information can be set to indicate an urgent message if the value of the state indication information is "0" and to indicate a non-urgent message if the value of the state indication information is "1".

When a receiving side receives an upper layer data block with an LCID of "C" and a state indication information value of "1", the receiving side determines that the upper layer data block corresponds to an urgent message and allocates radio resources according to the urgent message to the upper layer data block or requests that the transmitting side allocate radio resources according to the urgent message. The receiving side may perform or request processing of the upper layer data block by priority since the upper layer data block is an urgent message and may perform or request processing of the upper layer data block stronger at a physical stage since the upper layer data block is important information.

Table 3 illustrates LCIDs and state indication information values of events associated with the LCIDs according to the above embodiment of FIG. 5 in the case where 1-bit state indication information is used as described above.

TABLE 3

| LCID | state indication information = 1 | state indication information = 0 |
|------|----------------------------------|----------------------------------|
| A    | full header                      | compressed header                |
| B    | talk spurt period                | silent period                    |
| C    | urgent                           | non-urgent                       |

Although the state indication information in this embodiment indicates state indication information associated with an event of an upper layer data block that is being currently processed, it may serve as control information in a specific transmission period, for example, control information after or corresponding to a specific number of Transmission Time Intervals (TTIs), each of which is a basic transmission interval of a specific transport channel in the MAC layer.

Figure 6:
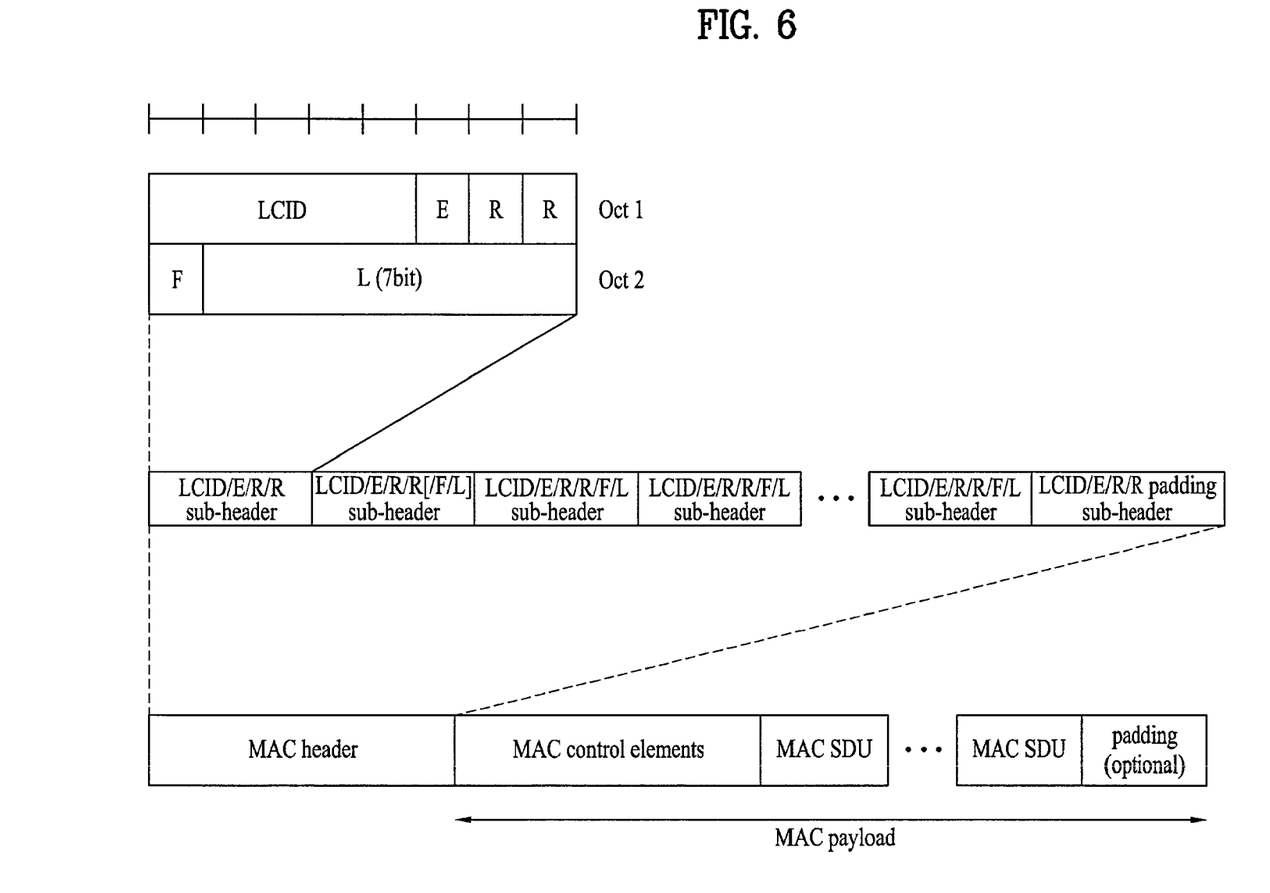
FIG. 6 illustrates an example structure of a MAC PDU in an E-UMTS suggested in another embodiment of the invention.

FIG. 6 illustrates a MAC header of an E-UMTS suggested in another embodiment of the invention.

A sub-head of a MAC PDU of the E-UMTS includes a 5-bit LCID field, a 1-bit E field, a 2-bit R field, a 1-bit F field, and a 7-bit (possibly, 15-bit) L field. In this embodiment, a MAC PDU includes a total of N upper layer data blocks. Therefore, a header of a MAC PDU also includes a total of N MAC PDU sub-heads. Details of the LCID field, the E field, the R field, and the L field are described above with reference to FIG. 2. In this embodiment of the invention shown in FIG. 6, one bit of the 2-bit R field is used as state indication information.

Unlike sub-heads of general MAC PDUs, the sub-header of this embodiment includes a format field F indicating the size of the length field. MAC control elements may include a Buffer Status Reporting (BSR) control element, a C-RNTI control element, a DRX command control element, and the like. The BSR provides information regarding the amount of data in an uplink buffer. The SSR control element provides information regarding the size of the buffer. The C-RNTI control element represents identification information of a new terminal which has entered a cell in a control RNC. The MAC control elements may also include other control elements as needed.

Each MAC PDU is generally processed in bytes. Therefore, when a total length of a combination of a MAC header, control elements, and MAC SDUs is not in bytes, a padding field is added to give a dummy value to the combination so that the total length is in bytes.

While the above embodiments of the present invention have been described focusing on the data communication relationship between transmitting and receiving sides for ease of explanation, the transmitting side may be a terminal or a base station in a network and the receiving side may be a base station in a network or a terminal. The terms used in the present disclosure can be replaced with other terms having the same meanings. For example, the term "terminal" may be replaced with another term such as "mobile station", "mobile terminal", "communication terminal", "user equipment (UE)", or "user device" and the term "base station" may be replaced with another term such as "fixed station", "Node B (NB)", or "eNode B (eNB)".

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention can be applied to a wireless communication system, and more particularly to a method for generating data blocks in a wireless communication system.

The invention claimed is:

1. A method for generating a data block at a medium access control, MAC, layer of a transmitting side in a wireless communication system, the method comprising:

receiving an upper layer data block from an upper layer; and generating the data block including a MAC header and a MAC payload, wherein the MAC payload comprises at least part of the upper layer data block and the MAC header comprises one or more sub-headers, wherein each of the one or more sub-headers comprises:

a LCID (logical channel identifier) field being used to indicate an identifier of a logical channel through which the upper layer data block is received, a 1-bit state indication information field being used to indicate a state of the upper layer data block, wherein the 1-bit value of the state indication information field is interpreted differently according to a value of the LCID field, and a L (length) field being used to indicate a size of the at least part of the upper layer data block, wherein the state indication information field in one of the one or more sub-headers indicates whether the upper layer data block includes a full header or a compressed header when the LCID field in the same sub-header indicates the upper layer data block is received through a logical channel related with an IP packet.

2. The method according to claim 1, wherein the state indication information field in one of the one or more sub-headers further indicates whether the upper layer data block has been generated in a talk spurt period or a silent period when the LCID field in the same sub-header indicates the upper layer data block is received through a logical channel related with a voice packet.

3. The method according to claim 1, wherein the state indication information field in one of the one or more sub-headers further indicates whether the upper layer data block is urgent information or non-urgent information when the LCID field in the same sub-header indicates the upper layer data block is received through a logical channel related with predetermined control information.

4. The method according to claim 1, wherein the state indication information field is included in a MAC sub-header corresponding to the upper layer data block.

* * * * *